United States Patent
Posamentier

(10) Patent No.: US 7,884,865 B2
(45) Date of Patent: Feb. 8, 2011

(54) HIGH SPEED NOISE DETECTION AND REDUCTION IN ACTIVE PIXEL SENSOR ARRAYS

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 11/953,761

(22) Filed: Dec. 10, 2007

(65) Prior Publication Data
US 2009/0146195 A1 Jun. 11, 2009

(51) Int. Cl.
H04N 5/217 (2006.01)
H04N 3/14 (2006.01)
H04N 5/335 (2006.01)

(52) U.S. Cl. .................. 348/241; 348/308

(58) Field of Classification Search ........ 348/241, 348/308, 301
See application file for complete search history.

(56) References Cited

U.S. PATENT DOCUMENTS

| 5,367,154 | A | 11/1994 | Pfeiffer | |
|---|---|---|---|---|
| 6,348,681 | B1* | 2/2002 | Kindt et al. | 250/208.1 |
| 6,532,040 | B1* | 3/2003 | Kozlowski et al. | 348/241 |
| 6,583,817 | B1* | 6/2003 | Lee | 348/241 |
| 6,753,912 | B1* | 6/2004 | Wayne | 348/241 |
| 6,927,796 | B2 | 8/2005 | Liu et al. | |
| 7,009,636 | B2 | 3/2006 | Liu et al. | |
| 7,023,364 | B2* | 4/2006 | Rose | 341/20 |
| 2005/0134714 | A1* | 6/2005 | Carlson et al. | 348/302 |
| 2009/0002533 | A1* | 1/2009 | Chen et al. | 348/301 |

FOREIGN PATENT DOCUMENTS

| EP | 1081941 A2 | 3/2001 |
|---|---|---|
| WO | 00/38409 A1 | 6/2000 |

OTHER PUBLICATIONS

Office Action Received for German Patent Application No. 102008058289.1, mailed on Mar. 26, 2009, 9 pages.
Office Action Received for Great Britain Patent Application No. GB0822490.9, mailed Apr. 14, 2009, 8 pages.

* cited by examiner

Primary Examiner—John M Villecco

(57) ABSTRACT

A system for detecting high speed noise in active pixel sensors includes a photodiode for receiving low levels of light, a reset transistor, an amplifier transistor, a row select transistor, and a high-speed analog-to-digital converter. The reset transistor gate receives a reset signal, and the reset transistor drain receives a reset voltage. The amplifier transistor gate is connected to the photodiode and the reset transistor's source. The amplifier transistor receives a supply voltage at the drain terminal. The row select transistor gate terminal receives a row select signal. The row select drain terminal is connected to the amplifier transistor source terminal. The high-speed analog-to-digital converter includes an analog input port connected to the row select transistor source and a digital output port capable of resolving high-speed excitation events received by the photodiode.

6 Claims, 4 Drawing Sheets

HIGH SPEED NOISE DETECTION AND REDUCTION IN ACTIVE PIXEL SENSOR ARRAYS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to imaging sensors and, more particularly, to noise reduction and data recovery in imaging active pixel sensors.

BACKGROUND

An image sensor is a device that converts a visual image to an electric signal. The image sensor is used chiefly in digital cameras, but may also be found in other imaging devices. The sensor is usually an integrated circuit containing an array of charge-coupled devices (CCDs) or CMOS pixel sensors, where the latter are referred to as active pixel sensors (APS).

The quality of an image produced using an image sensor may be distorted due to various noise levels introduced during capturing and producing the image. For example, as the area per active pixel element for imaging sensors shrinks, the pixel elements gather less light and may become more susceptible to current fluctuation (i.e., dark noise) generated by background radiation in a pixel element. The longer the pixel elements are exposed, in low light conditions, and the higher the amplification gain per pixel element, the more dark noise will result and cause image distortion.

Noise from random excitations of CCD or APS pixel elements may occur non-linearly over time, such as in single uncorrelated spikes or bursts of short duration. Noise from random excitations may come from the increased sensitivity of the pixels and high-energy random photons being detected in regions (e.g., the near infrared (NIR) or extreme ultraviolet (EUV)) that are not intended to be detected. For example, alpha particles or gamma ray photons can cause excitation in individual pixels. Such noise sources are high-speed, random, individual events that may typically occur in a single pixel, and account for a large fraction of total energy absorbed by the pixel in selected interval of time (i.e., frame), rather than a gradual, cumulative event.

Currently, in active pixel sensors that are controlled by row and column, it is not possible to detect a random excitation which deposits an excessive amount of energy in the pixel. To remedy this problem, a correction function is usually utilized which requires interpolation, or color channel filtering. Unfortunately, however, the data from cells that underwent excitation may be permanently lost, as a result of applying the correction function, all to the detriment of image quality.

There is a need, therefore, for methods and system to save the data that may be lost due to the above correction function to maintain a high picture quality, especially in a high-sensitivity sensor that may be subjected to high dose excitations of very short intervals.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein. A system for detecting high-speed noise in active pixel sensors includes a junction photodiode and a reset transistor. The reset transistor has a first source terminal, a first gate terminal and a first drain terminal, wherein the first source terminal is connected to the junction photodiode. The first gate terminal receives a reset signal, and the first drain terminal receives a reset voltage.

The system further includes an amplifier transistor having a second source terminal, a second gate terminal and a second drain terminal. The second gate terminal is connected to the junction photodiode and the reset transistor's first source terminal. The amplifier transistor's second drain terminal receives a supply voltage. The system further includes a row select transistor having a third source terminal, a third gate terminal and a third drain terminal.

The third gate terminal receives a row select signal, and the third drain is connected to the second source terminal of the amplifier transistor. A high-speed analog-to-digital converter having a first analog input port and a first digital output port. The first analog input port is connected to the third source terminal of the row select transistor.

A method for detecting high-speed noise in active pixel sensors comprises receiving a light signal at a junction photodiode in presence of a high speed excitation event. The received light signal is converted to an amplified voltage, and the amplified voltage is converted to a digital signal, wherein the converting to a digital signal is accomplished using an analog-to-digital converter circuit capable of resolving event signals up to a first frequency threshold.

One or more of the above-disclosed embodiments in addition to certain alternatives are provided in further detail below with reference to the attached figures. The invention is not, however, limited to any particular embodiment disclosed.

An active pixel sensor array may comprise individual active pixel sensor cells arranged in rows and columns. In a CMOS image sensor chip, the active pixel sensor includes extra circuitry associated with each photo sensor which converts the light energy to a voltage. Each pixel sensor contains a photodetector which is connected to an active transistor reset and readout circuit. Additional circuitry on the chip converts the voltage to digital data.

Figure 1:
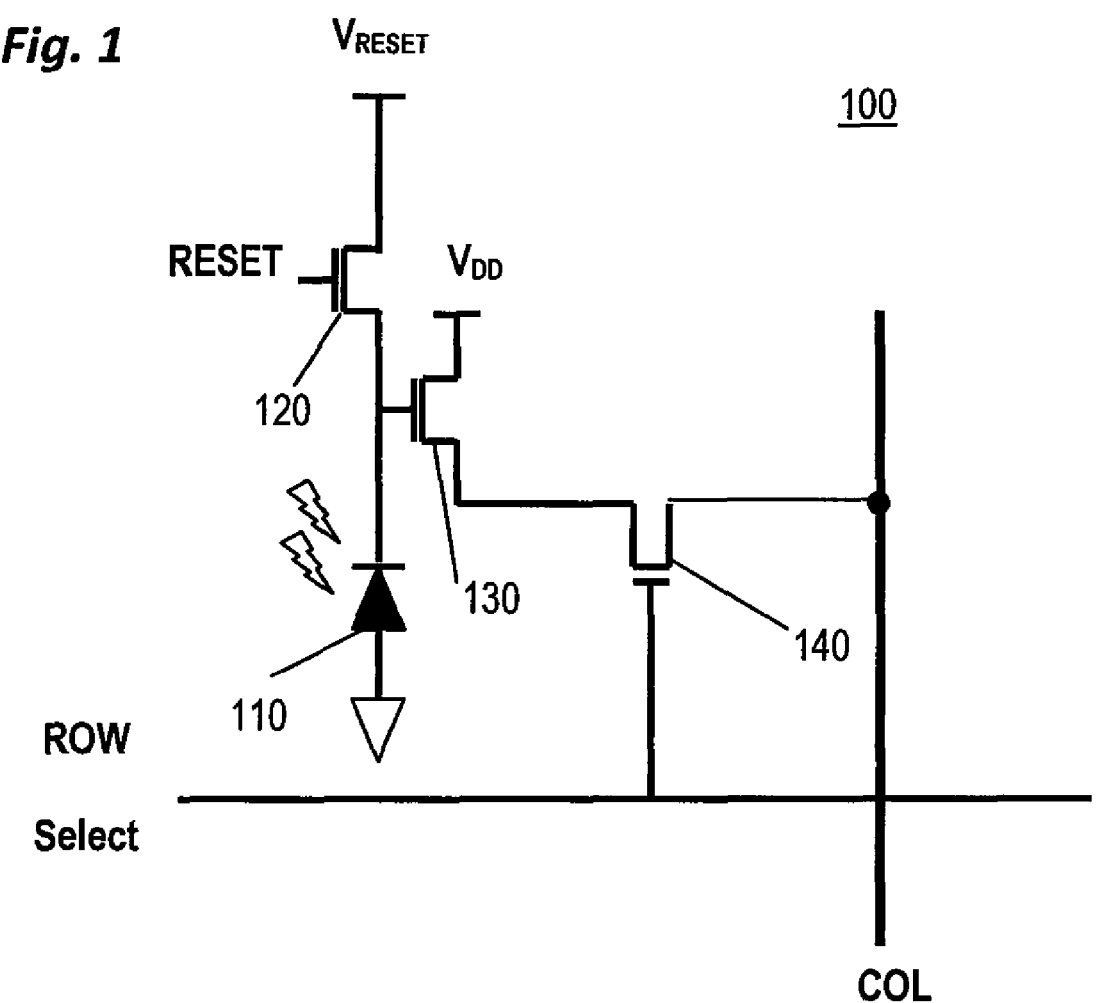
FIG. 1 illustrates an exemplary active pixel sensor circuit, in accordance with one embodiment.

As shown in FIG. 1, a CMOS APS 100 includes three transistors as well as a photodetector. The photodetector may usually be a junction photodiode. Light causes a current, or integration of charge on the 'parasitic' capacitance of the junction photodiode 110, creating a voltage change related to the incident light. A reset transistor 120 acts as a switch to reset the device. When reset transistor 120 is turned on, the photodiode is effectively connected to the power supply, VRESET, charging the junction to this voltage.

An amplifier transistor 130, in one embodiment, acts as a buffer amplifier which allows the pixel voltage to be observed without removing the accumulated charge. Amplifier transistor's 130 power supply, VDD, may be coupled to the power supply of the reset transistor 120, but may be associated with a separate voltage level.

Figure 2:
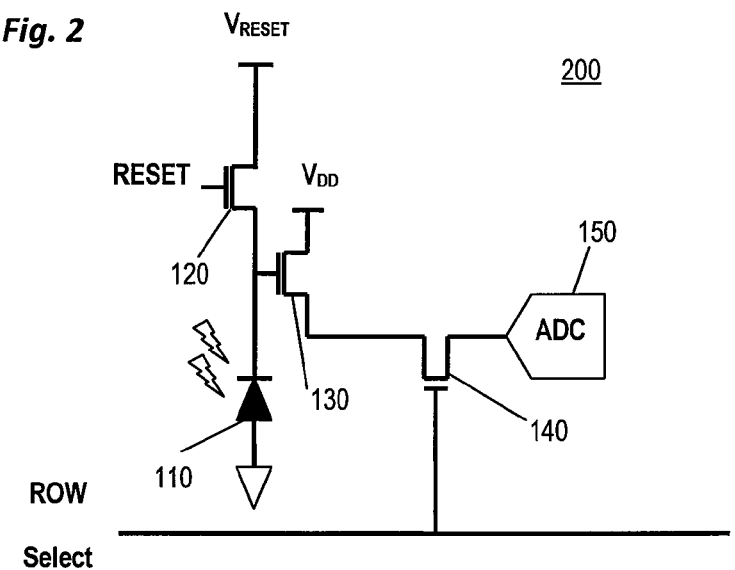
FIG. 2 is an active pixel sensor cell circuit for sampling detector response, in accordance with one embodiment.

In accordance with one embodiment, FIG. 2 shows an individual three transistor active pixel sensor (APS) cell 200, which includes a p-n junction photodiode 110 with an anode connected to ground. The p-n junction is an effective capacitance coupled to the source of a reset transistor 120 and a gate of an amplifying transistor 130 that serves as a source follower amplifier. Amplifying transistor 130 senses the charge from junction photodiode 110 without draining the junction photodiode 100, and provides a voltage output as a measure of the charge. The drains of the reset transistor 120 and of the amplifying transistor 130 may be connected to a supply voltage $V_{DD}$. In the exemplary embodiment shown in FIG. 2, the reset transistor 120 drain may be connected to a different voltage $V_{RESET}$.

The amplifying transistor 130 is coupled to a high-speed analog-to-digital converter (ADC) 150 through a row select access transistor 140, for example. The speed of the ADC 150, and similar digital components provided in more detail below, may be selected to be fast enough to detect sudden excitation changes in voltage levels up to a specified frequency response. When activated, reset transistor 120 places a charge on the junction of the photodiode 110 connected to the power supply $V_{RESET}$. This charge is drained through the junction photodiode 110 at a rate proportional to the intensity of light incident on junction photodiode 110. A signal proportional to this intensity can be read from the APS to a data line through ADC 150 by enabling row select access transistor 140 when a row select signal is applied, for example.

In a first operation state (e.g., a normal course of operation), $V_{RESET}$ may be the same for one or more (e.g., all) APS cells. Thus, at the beginning of an imaging cycle, one or more junction photodiodes 110 may be charged to $V_{RESET}$ when the reset signal is set. As photons arriving at junction photodiode 110 cause charges to drain to ground, the voltage appearing at the gate of amplifier transistor 130 may change from $V_{RESET}$ to ground, for example, resulting in a change in voltage seen at ADC 150. The voltage at ADC 150 may start, for example, at approximately zero and may change, depending on light intensity, to a value up to a saturation maximum equal approximately to $V_{DD}$.

In the first operation state, the shutter speed (i.e., the length of the time frame between resending of reset signals), may be set for the expected light conditions so that the photo intensity is not sufficient to drive the voltage at the gate of the amplifier transistor 130 to ground. Should this happen, ADC 150 may receive the full value of the supply voltage (i.e., $V_{DD}$) which corresponds to saturation. Thus, in accordance with one embodiment, ADC 150 provides an output that is within the dynamic range set by $V_{DD}$.

A sudden non-linear and discontinuous (i.e., quantum) excitation may cause a sudden drop in the charge left to drain through photodiode 110 junction, with the result that ADC 150 may register a saturation voltage before the end of the time frame, or at least register an output greater than expected in the absence of the excitation. In one embodiment, ADC 150 may have a sampling speed that is capable of sampling the voltage rise quickly enough to resolve the occurrence and magnitude of an unexpected discontinuous or quantum shift.

Figure 3:
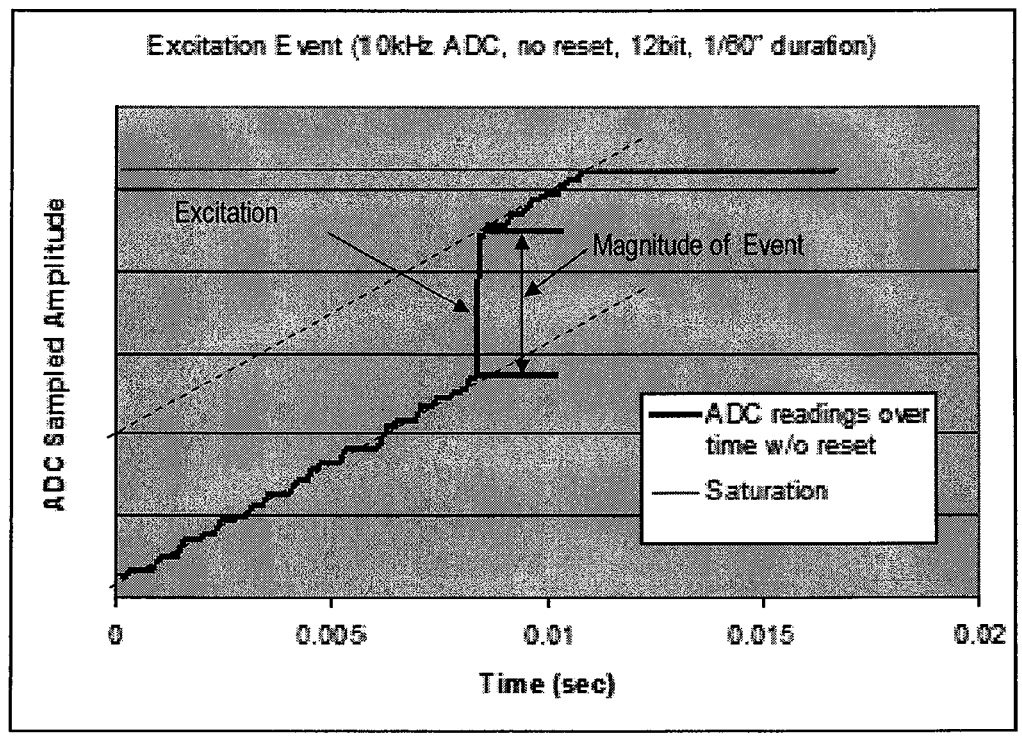
FIG. 3 is a graph illustrating an exemplary amplitude response time of the circuit of FIG. 1 to nonlinear excitation events.

FIG. 3 is a graph of an exemplary response time to a nonlinear excitation event for the APS cell circuit 100 illustrated in FIG. 2. As shown, in a ¹/₆₀th second (i.e., 0.0167 sec) time frame, ADC 150 registers a slow increase in accumulated photons, for example, in a low light level condition that may not saturate the range defined by $V_{DD}$. An exemplary non-image related excitation is shown occurring at approximately 0.008 seconds, which results in a discontinuous jump in the sampled signal at ADC 150, which has a frequency response high enough to resolve the excitation event at a satisfactory speed. As a result of the excitation event, the accumulated signal may reach saturation in ADC 150 before the end of the time frame.

The compensatory shift provided to the input of ADC 150 may be used to correct for a sudden offset signal in a variety of ways. For example, in APC cell circuit 400, shown in FIG. 4, the magnitude of the shift may be detected as a high-speed transient spike through a capacitor 160 between the source terminal of amplifier transistor 130 and driver circuit 170. Driver circuit 170 may provide a partial reset signal to the gate of reset transistor 120 sufficient to reset, as needed, the charge at junction photodiode 110 as seen at the gate of amplifier transistor 130.

The charge reset value desirably may be equal to a charge that would have been present in the absence of the excitation, thus providing a voltage at the gate of amplifier transistor 130 that would have been approximately equal to the same value of voltage that would have been present in the absence of the excitation, and provide continuity of imaging behavior. Continued photon absorption results in the charge draining through photodiode 110 and voltage at the gate of reset transistor 120 then changing correspondingly from the reset value as if the excitation had not occurred.

Figure 4:
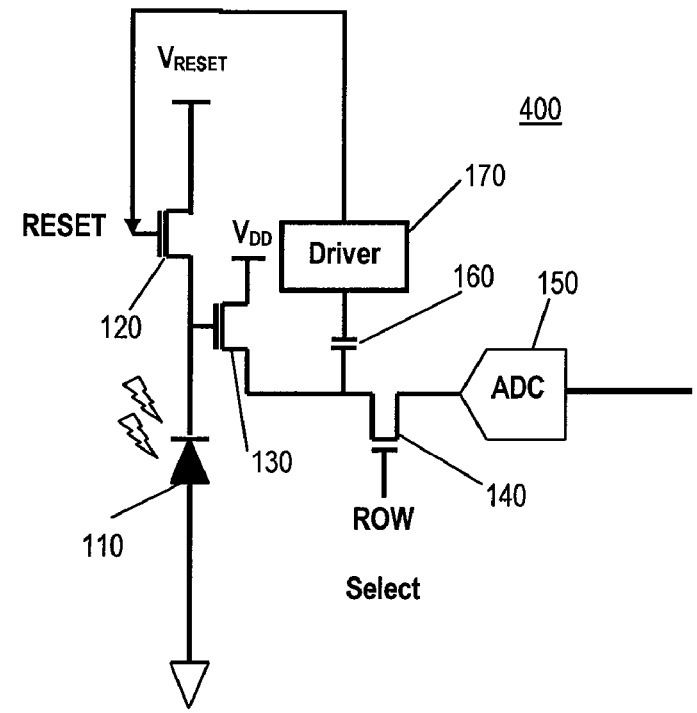
FIG. 4 is an active pixel sensor cell circuit for detecting a fast nonlinear excitation and correcting the cell output, in accordance with one embodiment.

In an alternative embodiment (not shown), capacitor 160 may instead be coupled between row select transistor 140 and ADC 150 to driver circuit 170, wherein driver circuit 170 provides the same correction required as in the embodiment shown in FIG. 4. The term coupled as used herein refers to a physical or logical connection between electrical components of the system.

Alternatively, in another embodiment (not shown), when an event is detected, the maximum pre-excitation voltage received at ADC 150 may be extrapolated to the end of the time frame (¹/₆₀$^{th}$ second, for example) to fill the pixel location to a non-saturated level that would have taken place in the absence of the excitation. That is, the saturation value output by ADC may be replaced by the extrapolated value. Referring to FIG. 3, it may be seen that the slope of the signal changes before and after the event may be substantially the same. The magnitude of the discontinuous increase in ADC 150 voltage measured may be subtracted, using software or hardware, and the signal reset to the extrapolated voltage.

Figure 5:
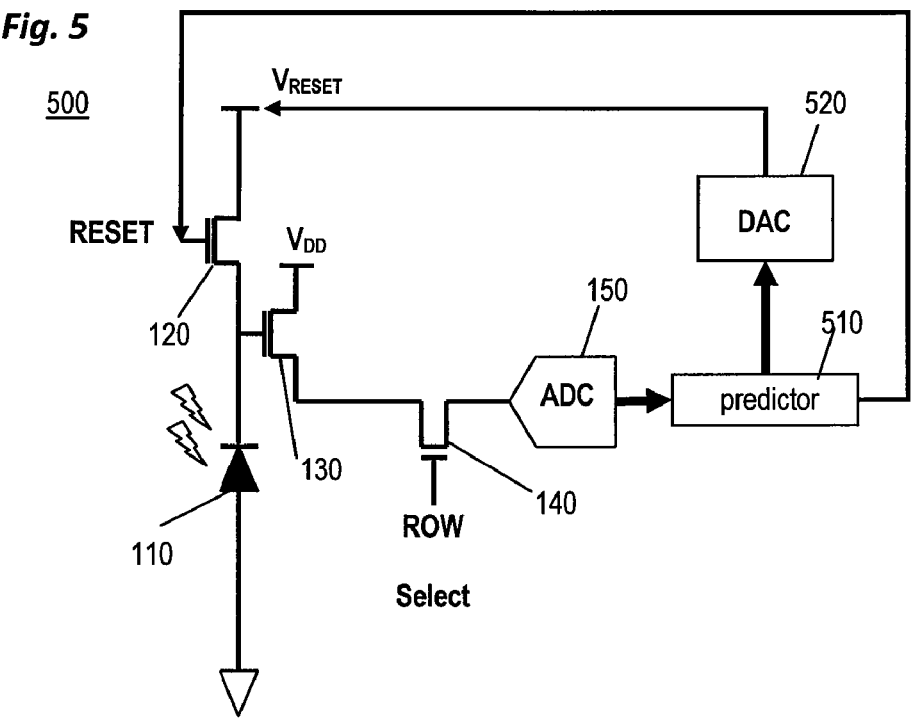
FIG. 5 is an active pixel sensor cell circuit for detecting a fast nonlinear excitation and correcting the cell output, in accordance with another embodiment.

FIG. 5 shows another exemplary embodiment of an APS cell 500, in which the sudden change in voltage seen at ADC 150 may be used to generate a reset signal on the reset transistor 120 gate and desirably simultaneously adjust $V_{RESET}$ to charge junction photodiode 110 to, for example, the same or an extrapolated voltage that would be seen at the gate of amplifier transistor 130 in the absence of the excitation. In imaging processes where the normal rate of change of charge drainage at photodiode 110 may be assumed to be constant over the interval of the time frame, a high-speed predictor circuit 510 operably coupled to ADC 150 may predict the voltage that may be expected in the next sampling period of ADC 150.

A sudden measured change that deviates from the predicted value may be input to a high-speed DAC 520 to provide a variable analog reset to the value of $V_{RESET}$ at the drain of reset transistor 120. Predictor circuit 510 may supply a reset signal to the gate of reset transistor 120 to permit charging of the junction of photodiode 110 to a level corresponding to the voltage predicted at the input to ADC 150. In a certain embodiment, predictor circuit 510 and DAC 520 may have frequency responses substantially the same as ADC 150 in order to respond to excitation events as needed.

Figure 6:
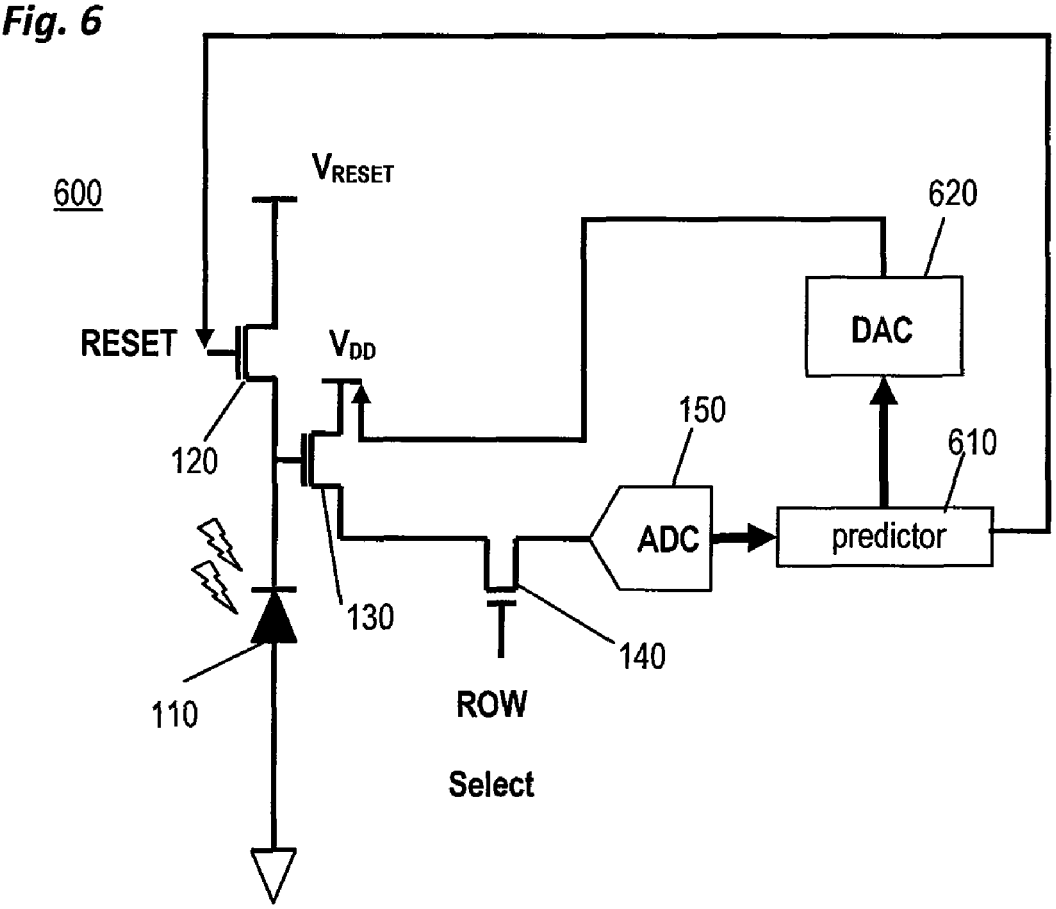
FIG. 6 is an active pixel sensor cell circuit for detecting a fast nonlinear excitation and correcting the cell output, in accordance with yet another embodiment.

FIG. 6 illustrates an APS cell 600, in accordance with yet another embodiment, wherein a predictor 510 is calibrated to instruct DAC 620 to adjust the supply voltage $V_{DD}$ to the drain of amplifier transistor 130 to reduce the voltage appropriately to match the voltage just prior to the occurrence of the nonlinear excitation event. Predictor 610 may be adapted to instruct DAC 620 to continuously adjust the supply voltage $V_{DD}$ for the duration of the time frame of light accumulation (e.g., $1/60^{th}$ of a second). In doing so, predictor 610 may prevent saturation of the pixel output signal.

It may be appreciated that, while the current drain through junction photodiode 110 may, for example, be substantially linear (e.g., under normal operations) over the length of the time frame, the rate of change of $V_{DD}$ provided by DAC 620 may have to obey a nonlinear time dependency to insure that ADC 150 receives a signal that mimics a normal rate of photon arrival at junction photodiode 110. Predictor 610 may control this relationship through DAC 620, and may distinguish between the normally linear change produced at the input of ADC 150 and any sudden nonlinear changes arising from external excitations.

Embodiments described above illustrate but do not limit the invention. Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A system for detecting high-speed noise in active pixel sensors, comprising:
   a junction photodiode;
   a reset transistor having a first source terminal, a first gate terminal and a first drain terminal, wherein the first source terminal is connected to the junction photodiode, the first gate terminal receives a reset signal, and the first drain terminal receives a reset voltage;
   an amplifier transistor having a second source terminal, a second gate terminal and a second drain terminal, wherein the second gate terminal is connected to the junction photodiode and the reset transistor's first source terminal, and wherein the amplifier transistor's second drain terminal receives a supply voltage;
   a row select transistor having a third source terminal, a third gate terminal and a third drain terminal, wherein the third gate terminal receives a row select signal, and the third drain is connected to the second source terminal of the amplifier transistor;
   a high-speed analog-to-digital converter having a first analog input port and a first digital output port, wherein the first analog input port is connected to the third source terminal of the row select transistor; and
   a predictor circuit having a second digital input port, a second digital output port and a second reset signal output port, wherein the second digital input port of the predictor circuit is connected to the first digital output port of the analog-to-digital converter.

2. The system of claim 1, further comprising:
   a digital-to-analog converter having a third digital input port and a third analog output port, wherein the third digital input port of the digital-to-analog converter is connected to the second digital output port of the predictor circuit, and the third analog output port of the digital-to-analog converter is connected to the first drain terminal of the reset transistor.

3. A method for reducing high-speed noise in active pixel sensors, comprising:
   receiving a light signal in the presence of a high speed excitation event at a junction photodiode having a first terminal and a second terminal, wherein the junction photodiode first terminal is coupled to a reset transistor and the second terminal is coupled to an electrical reference ground, wherein the reset transistor has a first source terminal, a first gate terminal and a first drain terminal, wherein the first source terminal is connected to the junction photodiode, the first gate terminal receives a reset signal, and the first drain terminal receives a reset voltage;
   amplifying the received light signal and the high speed excitation to a voltage using an amplifier transistor, wherein the amplifier transistor comprises a second source terminal, a second gate terminal and a second drain terminal, wherein the second gate terminal is connected to the junction photodiode's first terminal and the reset transistor first source terminal, such that the second drain terminal receives a supply voltage;
   outputting the amplified voltage to a row select transistor having a third source terminal, a third gate terminal and a third drain terminal, wherein the row select transistor's third gate terminal receives a row select signal, and the row select transistor's third drain is connected to the amplifier transistor second source terminal;
   providing the amplified voltage from the row select transistor to an analog-to-digital converter circuit having a first analog input terminal and a first output digital terminal, wherein the row select transistor's third source terminal is connected to the analog-to-digital converter circuit first analog input terminal;
   correcting the output of the analog-to-digital converter on the basis of the amplified voltage;
   providing the output of the analog-to-digital converter circuit first output digital terminal to a predictor circuit having a third digital input terminal, a third digital output terminal and a third analog output terminal, wherein the analog-to-digital converter circuit first output digital terminal is coupled to the predictor circuit third digital input terminal;

generating a digital signal from the predictor circuit third digital output terminal and an analog signal from the predictor circuit third analog output terminal; and receiving the digital signal from the predictor circuit third digital output terminal at a digital-to-analog converter circuit having a fourth digital input terminal and a fourth analog output terminal, wherein the predictor circuit third digital output terminal is coupled to the digital-to-analog converter circuit fourth digital input terminal.

4. The method of claim 3 further comprising:

coupling the digital-to-analog converter circuit fourth analog output terminal to the reset transistor first gate terminal;

providing the analog signal from the predictor circuit third analog output terminal to the reset transistor first gate terminal; and providing the analog signal output from the digital-to-analog converter fourth analog output terminal to the reset transistor first drain terminal.

5. The method of claim 4 further comprising:

outputting an appropriate amount of analog reset voltage from the digital-to-analog converter fourth analog output terminal to the reset transistor first drain terminal while outputting a reset signal from the predictor circuit third analog output terminal to the reset transistor first gate terminal sufficient to charge the junction photodiode first terminal and amplifier gate second terminal to an appropriate level to substantially offset the change in charge on the junction photodiode drain resulting from the excitation event.

6. A method for reducing high-speed noise in active pixel sensors, comprising:

receiving a light signal in the presence of a high speed excitation event at a junction photodiode having a first terminal and a second terminal, wherein the junction photodiode first terminal is coupled to a reset transistor and the second terminal is coupled to an electrical reference ground, wherein the reset transistor has a first source terminal, a first gate terminal and a first drain terminal, wherein the first source terminal is connected to the junction photodiode, the first gate terminal receives a reset signal, and the first drain terminal receives a reset voltage;

amplifying the received light signal and the high speed excitation to a voltage using an amplifier transistor, wherein the amplifier transistor comprises a second source terminal, a second gate terminal and a second drain terminal, wherein the second gate terminal is connected to the junction photodiode's first terminal and the reset transistor first source terminal, such that the second drain terminal receives a supply voltage;

outputting the amplified voltage to a row select transistor having a third source terminal, a third gate terminal and a third drain terminal, wherein the row select transistor's third gate terminal receives a row select signal, and the row select transistor's third drain is connected to the amplifier transistor second source terminal;

providing the amplified voltage from the row select transistor to an analog-to-digital converter circuit having a first analog input terminal and a first output digital terminal, wherein the row select transistor's third source terminal is connected to the analog-to-digital converter circuit first analog input terminal;

correcting the output of the analog-to-digital converter on the basis of the amplified voltage;

providing the output of the analog-to-digital converter circuit first output digital terminal to a predictor circuit having a third digital input terminal, a third digital output terminal and a third analog output terminal, wherein the analog-to-digital converter circuit first output digital terminal is coupled to the predictor circuit third digital input terminal.

* * * * *